United States Patent

De Filippis

[11] Patent Number: 6,163,122
[45] Date of Patent: Dec. 19, 2000

[54] HIGH-EFFICIENCY ELECTRIC MOTOR OF ELECTRONIC COMMUTATION TYPE

[75] Inventor: Pietro De Filippis, Monza, Italy

[73] Assignee: Bitron S.P.A., Pinerolo, Italy

[21] Appl. No.: 09/125,934

[22] PCT Filed: Feb. 26, 1997

[86] PCT No.: PCT/EP97/00923

§ 371 Date: Oct. 21, 1998

§ 102(e) Date: Oct. 21, 1998

[87] PCT Pub. No.: WO97/32390

PCT Pub. Date: Sep. 4, 1997

[30] Foreign Application Priority Data

Mar. 1, 1996 [IT] Italy ................................ TO96A0148

[51] Int. Cl.[7] .................................................. H02K 13/00
[52] U.S. Cl. ........................ 318/439; 318/254; 318/138; 310/184
[58] Field of Search .................... 318/254, 439, 318/138; 361/23; 310/184, 185, 186, 187, 188, 198

[56] References Cited

U.S. PATENT DOCUMENTS

| | | | |
|---|---|---|---|
| 3,188,545 | 6/1965 | Sheheen .................................. | 318/261 |
| 3,887,844 | 6/1975 | Yoshida .................................. | 317/13 R |
| 3,893,007 | 7/1975 | Mori ........................................ | 317/9 B |
| 3,913,000 | 10/1975 | Cardwell, Jr. . | |
| 3,916,272 | 10/1975 | Grunleitner et al. .................... | 318/138 |
| 4,030,005 | 6/1977 | Doemen .................................. | 318/138 |
| 4,070,606 | 1/1978 | Morozumi et al. ...................... | 318/254 |
| 4,435,673 | 3/1984 | Hagino et al. ......................... | 318/254 A |
| 4,494,058 | 1/1985 | Berti ....................................... | 318/372 |
| 4,506,203 | 3/1985 | Redmond, Jr. .......................... | 318/624 |
| 4,654,567 | 3/1987 | Bracha ................................... | 318/254 |
| 5,111,091 | 5/1992 | Bahn ...................................... | 310/68 B |
| 5,300,866 | 4/1994 | Yasohara et al. ....................... | 318/254 |

FOREIGN PATENT DOCUMENTS

| | | |
|---|---|---|
| 0 528 046 A1 | 2/1993 | European Pat. Off. . |
| 0 605 780 A2 | 7/1994 | European Pat. Off. . |

OTHER PUBLICATIONS

D.A. Philips, "Switched Reluctance Drives: New Aspects," IEEE Transactions on Power Electronics, vol. 5, No. 4, pp. 454–458, Oct. 1990.

*Primary Examiner*—David Martin
*Assistant Examiner*—Rita Leykin
*Attorney, Agent, or Firm*—Oblon, Spivak, McClelland, Maier & Neustadt, P.C.

[57] ABSTRACT

An electronic commutation motor including a stator unit configured as a pulse-modulation driven stator unit including at least two winding circuits in which an induced electromagnetic force is produced, and a phase switching switch; and a rotor unit powered by charge stored on a capacitor, wherein the capacitor is charged by diodes coupled between the capacitor the first winding circuits of the stator unit. In this way, the stator unit, serving as a first submachine, performs the function of power supply for the rotor unit serving as a second submachine, by charging of the capacitor via the diodes.

50 Claims, 9 Drawing Sheets

HIGH-EFFICIENCY ELECTRIC MOTOR OF ELECTRONIC COMMUTATION TYPE

BACKGROUND OF INVENTION

1. Field of the Invention

This invention relates to a high-efficiency electric motor of electronic commutation type.

2. Discussion of the Background

High-efficiency electrical machines of electronic commutation type, hereinafter known as ECMs, operate with pulse modulation and generally at ultrasonic frequencies, with absorption of very high ripple current pulses. Without the use of a costly and bulky L-C filter in the feed line, the conducted and radiated electrical disturbance levels would be greater than allowed by current regulations. To reduce costs, the filter can be replaced by one of active type able to decouple the current absorbed by the electric motor from the battery current. A known and particularly effective implementation, in terms both of cost and performance, is to interpose between the battery and the ECM a step-up converter current-controlled by means of $R_{FB}$ on the basis of control information $C_{FB}$ originating from the ECM, which is compared with a velocity input $V_{set}$ by known methods. This converter is characterised by operating with an output voltage $V_c$ greater than the battery voltage $V_b$, and by absorbing from the battery an essentially continuous current (of constant delivered power) with a ripple as small as desired, achieved by dimensioning the inductor L and the switching frequency by known methods. The waveform of the battery current $i_b$ is shown in FIG. 2, which shows the typical times associated with the operation: 1/T is the switching frequency, $T_{on}$ and $T_{off}$ are the on and off times of the electronic power switch P (FIG. 1); also shown are the ripple superimposed on the mean absorbed current and the composition of $i_b$, consisting of the sum of $i_P$ and $i_D$, this latter being integrated by the capacitor C to provide a mean current $i_2$ (from an essentially continuous $V_c$) which powers the ECM.

SUMMARY OF THE INVENTION

The object of the invention is to achieve the operability of the schematic of FIG. 1 essentially in terms of the waveform of the current absorbed from the battery, while significantly reducing cost and bulk by eliminating the inductance L and the switch P. As it is not possible to eliminate these components from an operational viewpoint, the invention proposes a solution which utilises certain switches and certain windings of the ECM, already present for its normal operation, to also perform the function of switch P and inductance L.

This object is attained according to the invention by a high-efficiency electric motor of electronic commutation type, having a single stator unit and a single rotor unit, including a first electrical submachine and a second electrical submachine, in which:

the first submachine is fed directly by a voltage source and is associated with a sensor for measuring the current absorbed from the feed; said first submachine including at least two windings characterised by an inductance, a resistance, an induced electromotive force and a switch connected in series;

the second electrical submachine is fed uniquely by a capacitor which is charged at a controlled voltage;

for each of said first windings there is provided a diode, having one of its poles connected to the end of the respective winding, which is connected to said switch, and the remaining pole connected to one of the ends of the capacitor thus charged at a controlled voltage;

the first submachine is pulse-modulation driven to obtain a closely DC current absorption from said voltage source with harmonics content as low as desired and, by charging the capacitor at the voltage via the diodes, said first submachine provides the unique power supply for said second submachine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
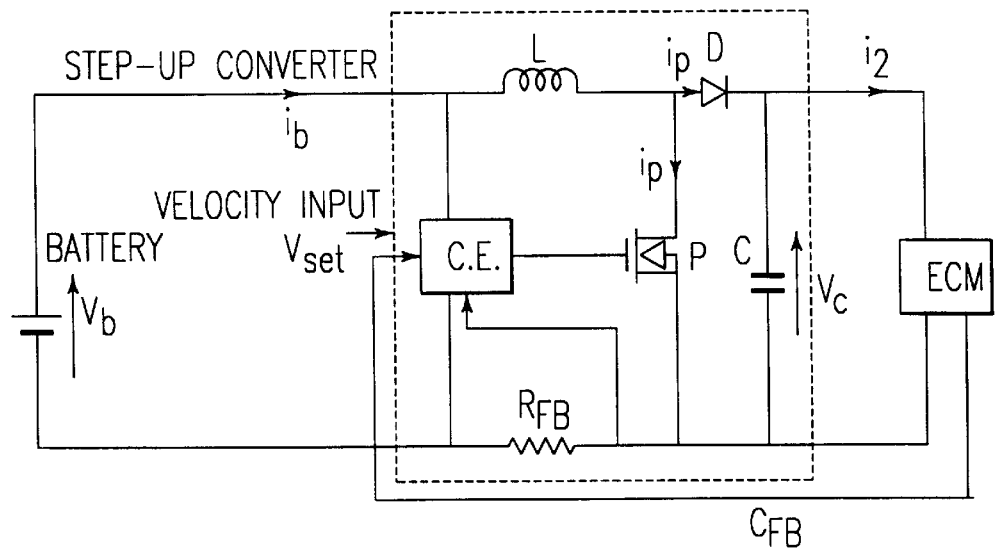
FIG. 1 is a schematic block diagram of an electric motor of known type.

Referring now to the drawings, wherein like reference numerals designate identical or corresponding parts throughout the several views.

Figure 3:
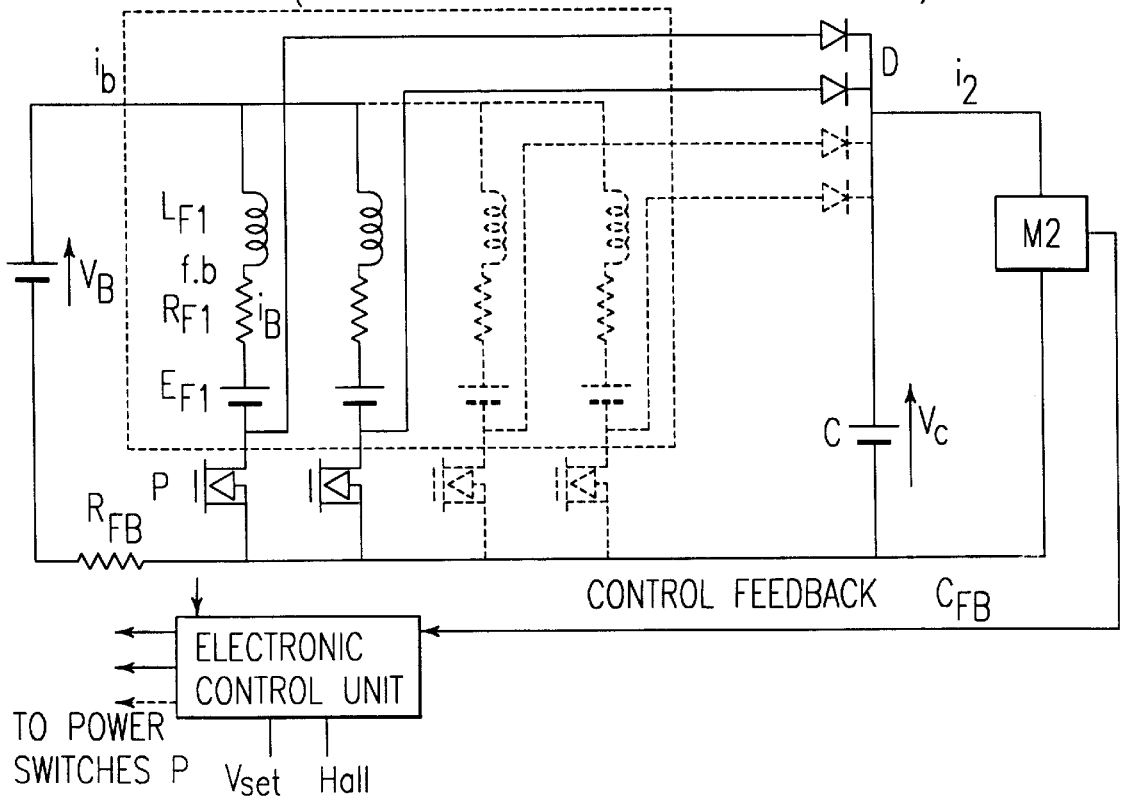
FIG. 3 is a schematic block diagram of the electric motor according to the invention.
Figure 2A:
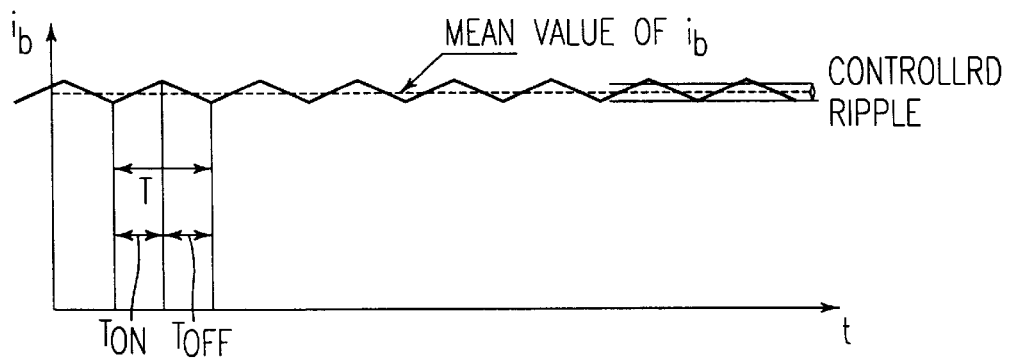
FIG. 2 shows the waveforms of the current through the motor of FIG. 1.
Figure 2B:
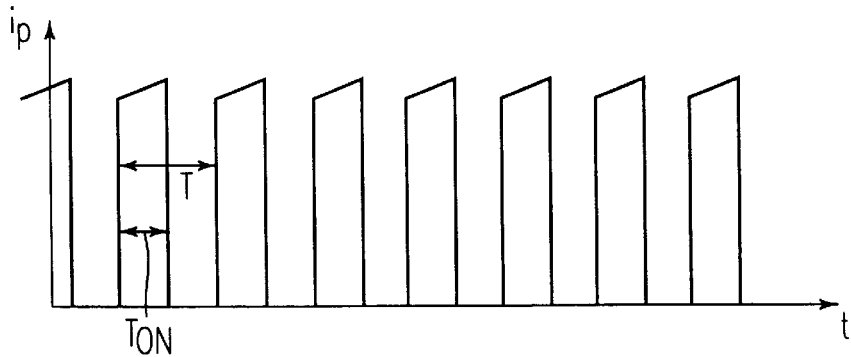
Figure 2C:
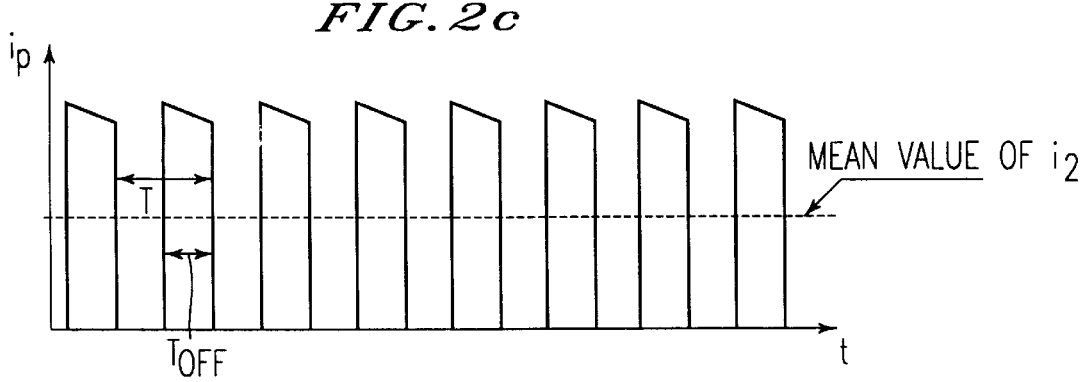

Essentially according to the invention, the inductance L and switch P of FIG. 1 are integrated into a suitably structured ECM, controlled and dimensioned to add to its electric motor function the function of active filter, so covering by itself the overall operability of the schematic of FIG. 1. The first feature of the ECM proposed by the invention (FIG. 3) is that it operates as two submachines which mechanically combine their contributions at the same rotor of the ECM whereas electrically they operate and are controlled as two separate machines. The first, known hereinafter as M1, is powered by the battery at voltage $V_b$, whereas the second, known hereinafter as M2, is powered by a capacitor C charged to a voltage $C_c$ by the operation of M1 as described hereinafter. The scheme is completed by the fast diodes D connected to the capacitor C as in FIG. 3. The velocity input $V_{set}$ and the signals of the Hall position sensors are also shown.

The second feature is that in order to also perform the function of the inductance L and the switch P of FIG. 1, the submachine M1 must be designed with a unipolar structure with two or more windings (depending on the number of phases to be determined and the number of windings to be powered in parallel) with the magnetic coupling between them as loose as possible. The inductances of its windings and the switches P already proposed for their normal PWM driving provide the L and P functions of FIG. 1.

The third feature is that the submachine M2 can have a different number of phases and windings than the submachine M1, with any magnetic coupling between them, but magnetically decoupled from the windings of M1.

The fourth feature is that the driver of M2 is totally independent of that of M1. It can therefore be of unipolar, bridging, linear or PWM type and is characterised by having a control function (for example a control feed-back on $V_c$) which ensures that under all operating conditions the current induced by the operation of M1 via the diodes D is totally absorbed by M2. Without limiting the generality of the aforedescribed principle of operation, for greater clarification and for providing the main design principles, reference will be made to a two-phase battery powered unipolar brushless motor of permanent magnet type.

Figure 4:
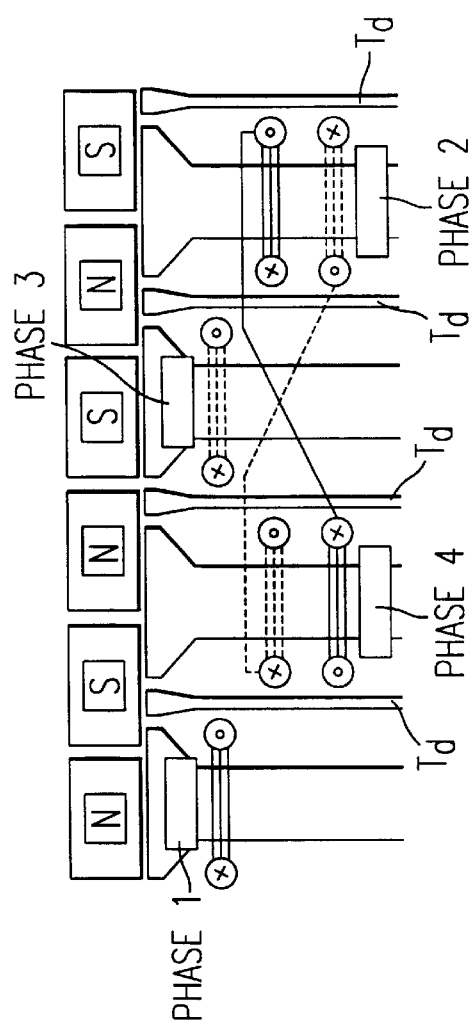
FIGS. 4 and 5 are illustrations of two electromagnetic structures forming the electric motor of the invention.
Figure 5:
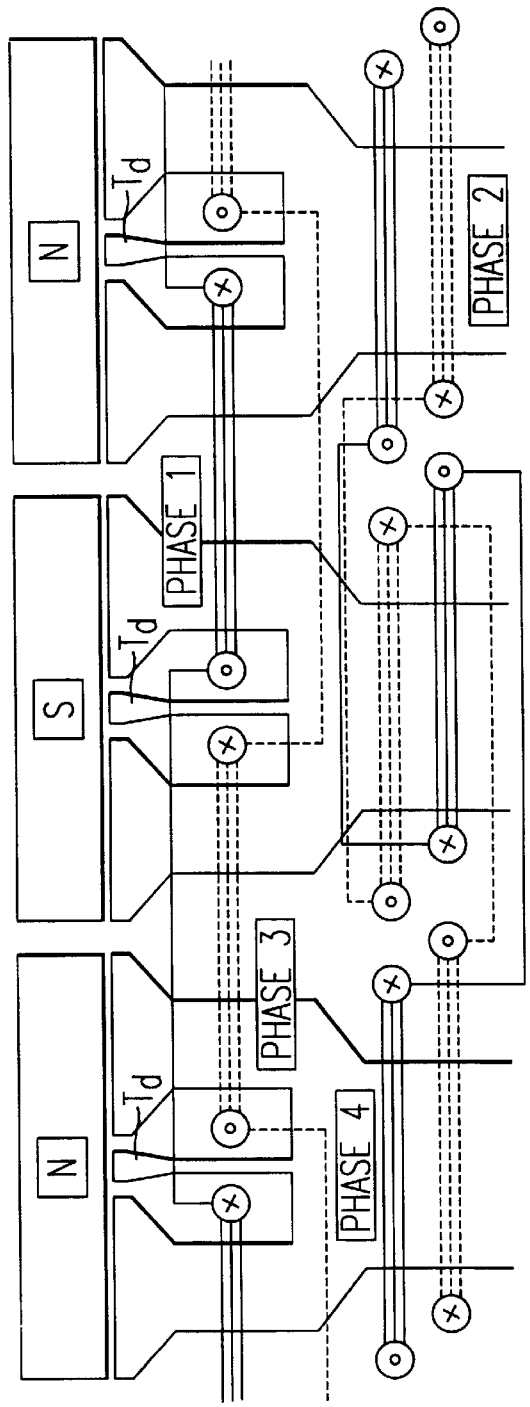

Two electromagnetic structures which implement the aforesaid magnetic coupling conditions are shown in FIGS. 4 and 5 by way of non-limiting example.

In particular, for the same nominal ECM operating conditions and the same number of poles, the structure of FIG. 5 has a lower phase inductance and a lesser demagnetising reaction (⅓ of that of the structure of FIG. 4).

Figure 6:
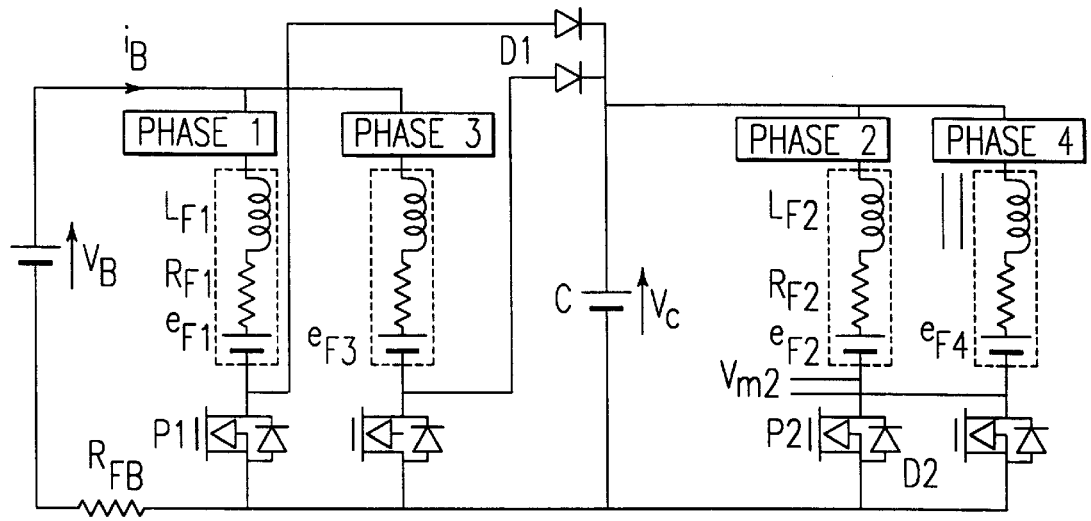
FIG. 6 is a schematic block diagram of a specific electric motor of the invention.
Figure 7:
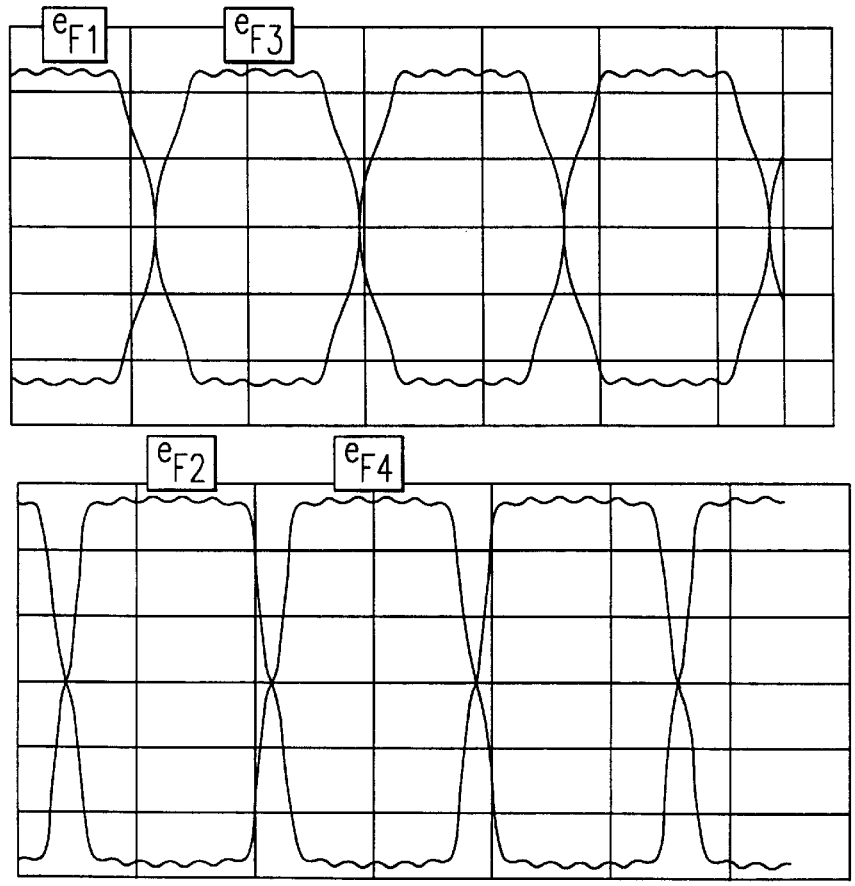
FIG. 7 is an illustration of waveform diagrams illustrating the phase emfs of the motor of the invention.

The specific schematic which achieves the said principles (FIG. 1 and FIG. 3) is shown in FIG. 6. To complete the control electronics, in addition to that already described it includes two signals $V_{m2}$ for operating by known circuits (clamping circuits) a protection at overvoltages exceeding the VDSS allowed by the switches P2. These latter together with other circuit details are known and do not form part of the inventive idea, and will therefore not be referred to hereinafter. The chosen two-phase structure is for example of known type with four unipolar windings powered as two single-phase machines (at full half-wave). The first single-phase machine (consisting of PHASE 1 and PHASE 3) covers the role of the submachine N2 and is powered at $V_c$. The emfs of each phase ($e_{F1}$, $e_{F2}$, $e_{F3}$, $e_{F4}$) are shown in FIG. 7, where it can be seen that they are out of phase by 90 electrical degrees.

The magnetic structure, the seat of the magnetic flux generated by the currents in each winding of the submachine M1 (identified in FIGS. 4, 5 and 6 as PHASE 1 and PHASE 3), must be such as to ensure that the inductances of these windings are as mutually decoupled as possible to prevent absorbed current gaps during switching between one winding and the next in the driving sequence (a known problem when mutual inductance exists between the two) and that the inductive couplings with the sindings of M2 are marginal. This is achieved by the presence of non-wound decoupler teeth (indicated by $T_d$) and winding the two phases (PHASE 1 and PHASE 3) on physically separate teeth (see FIGS. 4 and 5). Said M2 windings also operate as an electric motor generating an active torque, as they suitably engage the pertinent emf half-wave by known methods (e.g. suitable decoding of Hall position sensors). The magnetic structure, the seat of flux generated by the currents in each winding of the submachine M2 (identified in FIGS. 4, 5 and 6 as PHASE 2 and PHASE 4), must ensure in this case a very tight magnetic coupling between them to enable the stored magnetic energy (from the windings which cease to conduct to those which begin to conduct) to be transferred during switching with minimum losses via the diodes D2 (known operation). This is achieved by winding said phases on the same teeth (see FIGS. 4 and 5).

As the two submachines operate in parallel in providing the desired mechanical power it is generally advantageous to dimension them such that, at least under nominal conditions, both the mechanical power supplied and the losses are divided into equal parts.

The design data for said operating point (n) are:

$P_{mach(n)}$ mechanical power

RPM(n) velocity $\eta(n)$ efficiency $V_b$ feed voltage

Knowing the design data, the geometry and the materials chosen for constructing the machine, the iron, ventilation and friction losses $P_{fe,v,a(n)}$ can be predicted by known methods.

Figure 8:
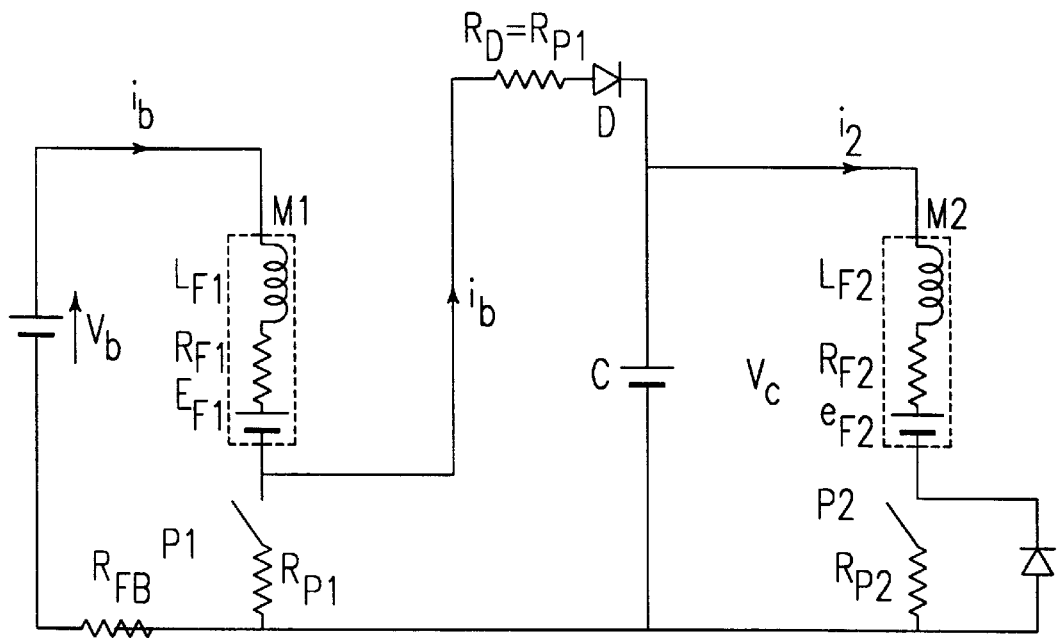
FIG. 8 is a simplified schematic block diagram corresponding to that of FIG. 6.

The value of $R_{FB}$ is chosen such that the voltage drop across it can be considered negligible as a first approximation, so that to simplify the calculations the diode is simulated as an ideal diode with a resistor equal to $R_{pi}$ in series (see FIG. 8).

By way of example, for the machine of FIG. 8 the equivalent scheme shown in FIG. 6 can be used, which shows the essential components for dimensioning the two machines, these being:

$L_{f1}$ inductance of each winding of M1

$R_{f1}$ resistance of each winding of M1

$E_{f1}$ mean emf per half wave at the nominal velocity of each winding of M1

$R_{P1}$ internal resistance of the power switch (e.g. MOSFET) for each winding of M1.

FIG. 8 also shows the corresponding elements for M2.

The two submachines (M1) and (M2) must be designed as follows. Dimensioning of submachine M1:

The first element immediately obtainable is $i_{1(n)}$ from $$\eta(n)=P_{mech(n)}/V_{b(n)}i_{1(n)}$$

hence $$i_{1(n)}=P_{mech(n)}/V_{b(n)}N_{(n)} \quad \text{(eq. 1)}$$

Equation 1, together with cost considerations and other known operational aspects of the switch P1, enables its type to be identified and hence $R_{P1}$ to be qualified as an item of data. Having identified $i_{1(n)}$ and $R_{P1}$, $E_{f1}(n)$, $E_{f1(1000)}$ and $R_{f1(n)}$ can be obtained. From the known relationship $P_{gap}=P_{mech}+P_{fe,v,a}=E \cdot I$ and remembering that the power has to be distributed equally between the machines M1 and M2, the for M1:

$$E_{f1(n)}i_{1(n)}=[V_{b(n)}i_{1(n)}\eta_{(n)}+P_{fe,v,a(n)}]/2$$

hence $$E_{f1(n)}=½[V_{b(n)}\eta(n)+P_{fe,v,a(n)}/i_{1(n)}]$$

which by replacing $i_{1(n)}$ by eq. 1 gives:

$$E_{f1(n)}=½V_{b(n)}\eta(n)[1+P_{fe,v,a(n)}/P_{mech(n)}] \quad \text{(eq. 2a)}$$

As $P_{fe,v,a(n)}$ is negligible compared with $P_{mech(n)}$, (eq. 2a) can 5 be rewritten as $$E_{f1}(n) \approx \tfrac{1}{2} V_{b(n)} \eta(n) \qquad \text{(eq. 2b)}$$

from which $E_{f1(1000)}$ can be obtained as follows:

$$E_{f1}(1000) = [E_{f1(n)}/\text{RPM}(n)] \cdot 1000 \qquad \text{(eq. 3)}$$

Hence using known formulas the number of turns of the winding and the value of $L_{f1}$ can be calculated. To obtain $R_{f1(n)}$ an energy balance can be used in which the machine M1 absorbs 50% of the total power. Hence:

$$[E_{f1(n)} + (R_{f1} + R_{P1})i_{1(n)}]i_{1(n)} = \tfrac{1}{2} V_{b(n)} i_{1(n)}$$

giving $$E_{f1}(n) + (R_{f1} + R_{P1})i_{1(n)} = \tfrac{1}{2} V_{b(n)}$$

from which $$R_{f1} = [V_{b(n)}/2 - E_{f1(n)}]/i_{1(n)} - R_{P1} \qquad \text{(eq. 4)}$$

Dimensioning of submachine M2:
Defining $T_{on}$ and $T_{off}$ as the on and off times of the switches P1 respectively, $$T = T_{on} + T_{off},\ D = T_{on}/T,\ T_{off}/T = (1-D).$$

Regardless of the voltage $V_c$ across the capacitor C, its charging current can be obtained from the always valid relationship:

$$i_2 = i_1\, T_{off}/T = i_1(1-D)$$

which at the nominal operating point can be written as $$i_2(n) = i_1(n)(1-D(n)) \qquad \text{(eq. 5)}$$

The relationships between M2 and M1 for their respective characterising elements can now be obtained. Remembering the condition of equal power, then:

$$E_{f2(n)} \cdot i_{2(n)} = E_{f1(n)} \cdot i_{1(n)}$$

hence $$E_{f2(n)} = E_{f1(n)} \cdot i_{1(n)}/i_2(n)$$

and finally $$E_{f2(n)} = E_{f1(n)}/(1-D_{(n)}) \qquad \text{(eq. 6)}$$

Remembering also the condition of equal dissipated power, then:

$$R_{f2(n)} \cdot i_2(n)^2 = R_{f1(n)} \cdot i_{1(n)}^2$$

hence $$R_{f2(n)} = r_{f1(n)} \cdot (i_{1(n)}/i_{2(n)})^2$$

and finally $$R_{f2(n)} = R_{f1(n)}/(1-D_{(n)})^2 \qquad \text{(eq. 7)}$$

The only unknown is $D_{(n)}$, which can be obtained from $$\Delta i_{1,Ton} = \Delta i_{1,Toff}$$

from which, having assumed $RD = Rp1$ $$(V_b - [E_{f1} + (R_{f1} + R_{P1})i_1])T_{on}/L_{f1}T = (R_{P1}i_1 + V_c - [V_b - (E_{f1} + R_{f1}i_1)])T_{off}/L_{f1}T \qquad \text{(eq. 8)}$$

Putting $A = V_b - [E_{f1} + (R_{f1} + R_{P1})i_1]$, then:

$$D = (V_c - A)/V_c \qquad \text{(eq. 9)}$$

Hence, remembering (eq. 4), $$1 - D_{(n)} = v_{b(n)} \cdot V_{c(n)}/2 \qquad \text{(eq. 10)}$$

from which it can be seen that having fixed $V_b$, $(1-D_{(n)})$ is defined unambiguously by $V_{c(n)}$.

The three ensuing conditions help to define $V_{c(n)}$ unambiguously. These are:

Condition 1

Figure 9:
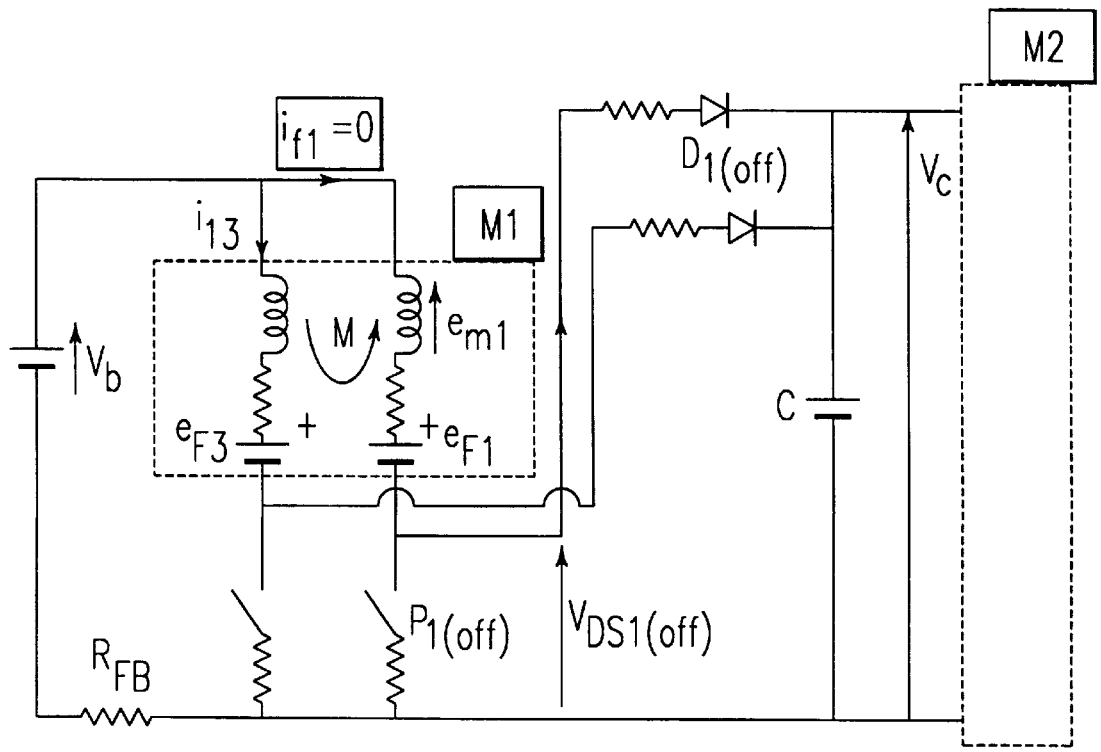
FIG. 9 is a further schematic block diagram of the machine of the invention.
Figure 10:
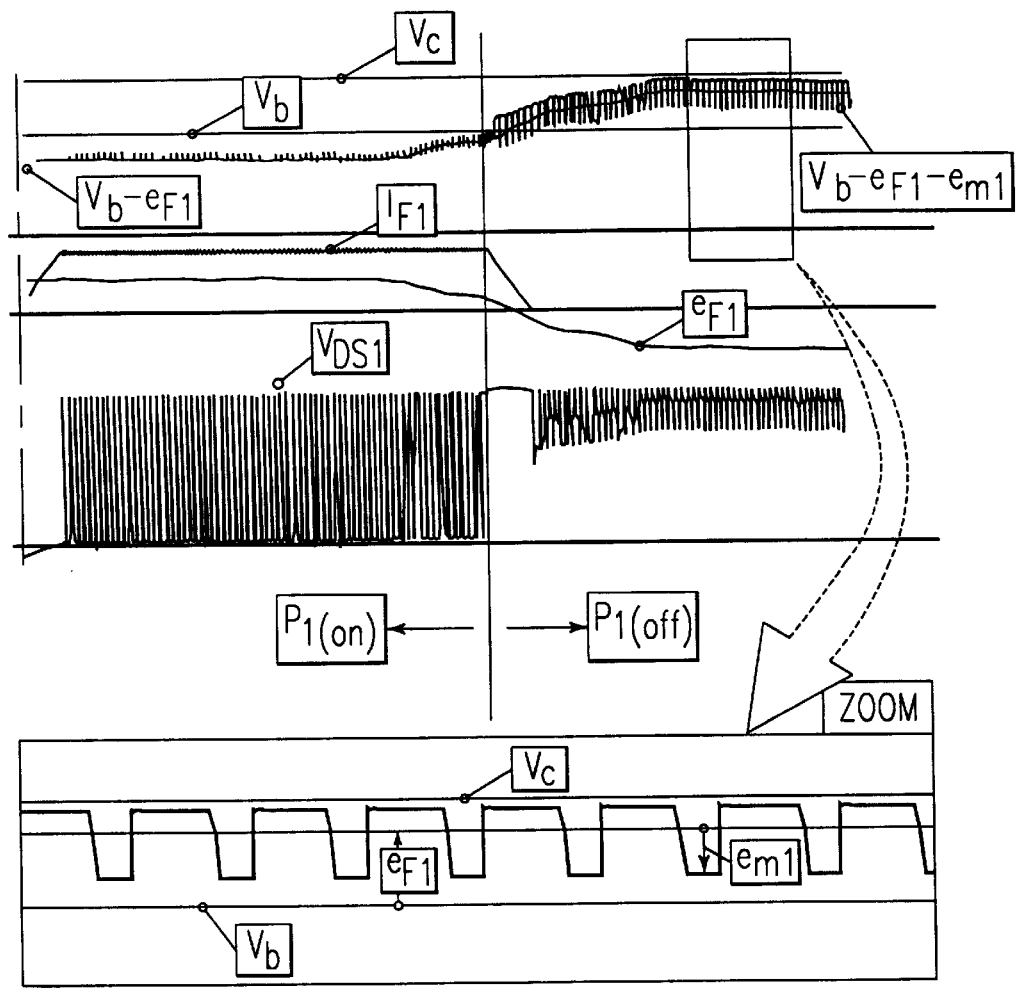
FIG. 10 is a waveform diagram.

In order for current not to circulate through that winding of the submachine M1 which with its emf, the sum of the motional part $E_{f1(n)}$ and the transformer part $E_{m1(n)}$ due to undesirable coupling between the windings of the submachine M1 and between these and those of the submachine M2, would give a negative contribution to the development of mechanical power, the voltage $V_{DS1(off)}$ across the power switch $P_{1(off)}$ connected to said winding must be less than the voltage across the capacitor C. Only in this manner can the diode $D_{1(off)}$ be polarised inversely and hence current cannot pass therethrough. The following condition must therefore be satisfied (see FIGS. 8 and 9):

$$V_{c(n)} \geq V_{DS1(off)} = V_{b(n)} + E_{f1(n)} + E_{m1(n)} \qquad \text{(cond. 1)}$$

Condition 2

As the maximum voltage $v_{DS2(off)}$ across the power switch P2 occurs during the time interval in which that winding of the submachine M2 connected to it is inactive, then:

$$V_{DS2(off)} = V_{c(max)} + E_{f2(max)} = 2V_{c(max)};$$

hence in order for the rupture voltage $V_{DSS2}$ of the power switch P2 not to be exceeded, the following condition must be satisfied:

$$2V_{c(max)} < V_{DSS2} \qquad \text{(cond. 2)}$$

Condition 3

Remembering that:
the coupling between the windings of the submachine M2 must, as stated, be as high as possible;

the transfer of magnetic energy, which occurs through D2 during switching between the windings of submachine M2, is less dissipative the higher the difference between the feed voltage, which in this case is $V_c$, and the transient overvoltage $V_{ts2(off,t)}$ (made as close as possible to $V_{DSS2}$ by said clamping circuits) which appears across the power switch P2 when it opens;

the cost of the capacitor C increases with its rated voltage; it is apparent that $V_{c(n)}$ must be as low as possible (cond. 3).

Given that in practice:

$$E_{f1(n)} + E_{m1(n)} \approx \tfrac{1}{2} V_{b(n)}$$

then (see (cond. 1))

$$V_{c(n)} \approx 3/2 \, V_{b(n)} \qquad \text{(eq. 11)}.$$

From (eq. 10) and (eq. 11) the following are also obtained:

$$i_{2(n)} = i_{1(n)}/3 \qquad \text{(eq. 12.1)}$$

$$E_{f2(n)} = 3 E_{f1(n)} \qquad \text{(eq. 12.2)}$$

$$R_{f2(n)} = 3^2 R_{f1(n)} \qquad \text{(eq. 12.3)}$$

$$P_{p2(n)} = 3^2 r_{P1(n)} \qquad \text{(eq. 12.4)}$$

Equations 12.1–12.4, which unambiguously determine the dimensioning of the submachine M2, show an interesting aspect from the constructional viewpoint, namely that for the two submachines, wire of the same cross-section can be used, with a different number of wires in parallel for the two submachines.

If $1_m$ is the mean turn length identical for all windings of the two submachines, $S_{c1}$ the wire cross-section of each winding of the submachine M1 and $S_{c2}$ the wire cross-section of each winding of the submachine M2, then:

$$R_{f1} = \rho(l_m N_{s1})/C_{c1} \qquad \text{(eq. 13.1)}$$

$$R_{f2} = \rho(l_m N_{s2})/C_{c2} \qquad \text{(eq. 13.2)}$$

Given that from (eq. 12.2) it can be deduced that the number of turns $N_{s1}$ of each winding of the submachine M1 must be ⅓ the number $N_{s2}$ of each winding of the submachine M2:

$$N_{s1} = \tfrac{1}{3} N_{s2} \qquad \text{(eq. 13.3)}$$

From (eq. 12.3) and (eq. 13.1–13.3):

$$\rho(l_m N_{s2})/S_{c2} = 3^2 \rho(l_m N_{s1})/S_{c1} = 3^2 \rho(l_m N_{s2}/3)/S_{c1}$$

hence $$S_{c1} = 3 S_{c3} \qquad \text{(eq. 14)}$$

This latter shows that the winding of the submachine M1 can be formed by positioning in parallel three wires of cross-section identical to that of the single wire used for the winding of the submachine M1. A PWM control strategy at fixed frequency is normally implemented on step-up converters of the type shown in FIG. 1. Given that, as clarified in the description of the inventive idea, the function of the inductor L of FIG. 1 is performed by windings which are the seat of induced emf, a strategy such as the aforegoing would make it difficult to contain the battery current ripple within predetermined limits. For this reasom the control strategy adopted is of hysteresis type, which acts only on the on phase of the submachine M1 and, in accordance with known methods, maintains the current is absorbed by the ECM, as measured through the resistor $R_{FB}$, within predetermined maximum and minimum values such as to make the ripple as small as desired compatible with the technical limitations related to the state of the art of the switching devices used. This naturally means that the switching frequency of the power switches of the submachine M1 is not set but is directly related to its electrical parameters (inductance, emf, feed voltage). Conveniently, a control strategy is used for the voltage $V_c$ across the capacitor C which for each delivered torque and rotational velocity condition satisfies the said (cond. 1), while maintaining the difference between $V_c$ and $V_{DS1(off)}$ as small as desired by known methods. The said strategy enables the battery current to be fully-controlled during switching between windings of the submachine M1. If during switching between windings of the submachine M1 it happens that the current in the phase which is switched off decreases more rapidly than the current increase in the phase which is switched on, the current is fails to below the minimum set value. If in contrast when one phase is switched off the current decreases more slowly than the current increase in the phase which is switched on, the is control maintains it within the preset limits. To obtain this condition it is necessary that during the switching time the average value of $E_{f1}$, known as $E_{f1,avg}$ is such that $$V_b - E_{f1,avg} > V_c - (V_b - E_{f1,avg})$$

As $V_c \approx 3/2 \, V_b$, necessarily $E_{f1,avg} < 0.25 \, V_b$.

Figure 11:
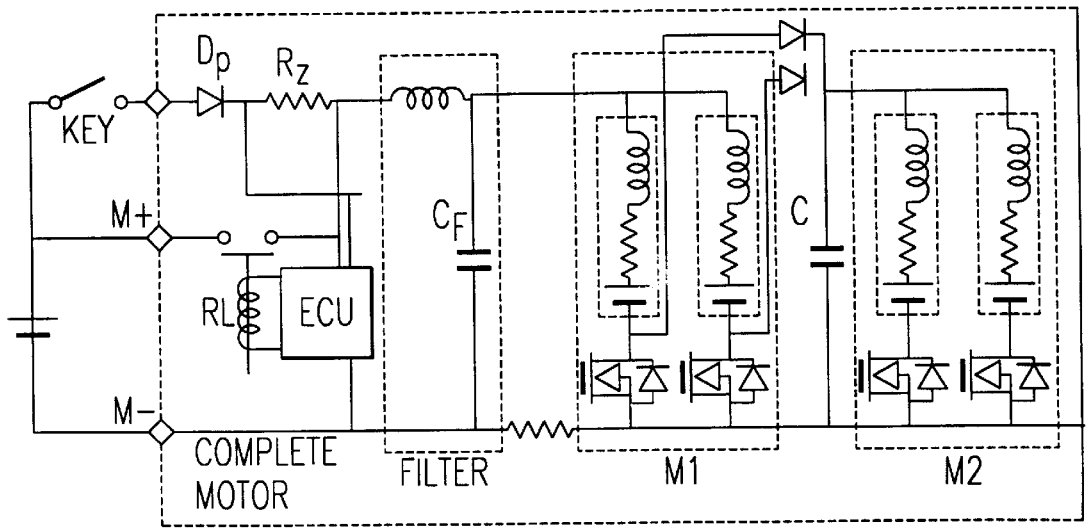
FIG. 11 is a schematic block diagram of the motor of the invention provided with protection devices.

Given that this is achieved by simply anticipating switching (already necessary for operation of the submachine M2 and easily implemented), the absorbed current ripple is hence easily controllable in any event. A filter for eliminating conducted and radiated electrical disturbances is conveniently positioned in the ECM feed line (see FIG. 11) and is of much smaller cost and size than that required for an ECM which does not implement the inventive idea. The simplest way of protecting a battery-powered ECM is to connect a power diode in series with the operating relay. Besides being costly and bulky, this diode introduces a voltage drop (typically 0.7 Volt) and hence reduces the EM efficiency (for equal absorbed power). The operating relay, which is key-operated, has to withstand a switch-on current which is so high as to require: unacceptable overdimensioning. According to the schematic shown in FIG. 11 the ECM is instead directly powered by the battery via the relay RL controlled by the electronic control unit ECU. A lower-power diode $D_P$ and a ballast resistor $R_z$ are connected as shown in FIG. 11. Given that the electronic control unit which controls the relay RL is key-powered via $D_p$, the ECM is protected against polarity inversion. The ballast resistor $R_z$ prolongs the duration of the current pulse which charges the capacitors C and $C_F$ when the starting switch is operated, so limiting the extent of the dV/dt to which the capacitors are subjected and preventing passage of destructive current through the switch. The electronic control unit ECU measures the voltage across the resistor $R_z$ and enables the relay RL only when this voltage, and hence the switch-on current, fails below a predetermined safety level.

Referring to eq. (11) $V_c \approx 3/2 \, V_b$, there are some cases (for instance to lower the rms current through the capacitor C, to lower the current through the switches of submachine M2, etc.) in which it is necessary to have $V_c > 3/2\ V_b$. In that case it could happen that during the commutation between the phases of the submachine M1, the current in the phase which is switched off decreases more rapidly than the current increase in the phase which is switched on: the battery current will fall out of the prescribed tolerance-band.

Figure 14:
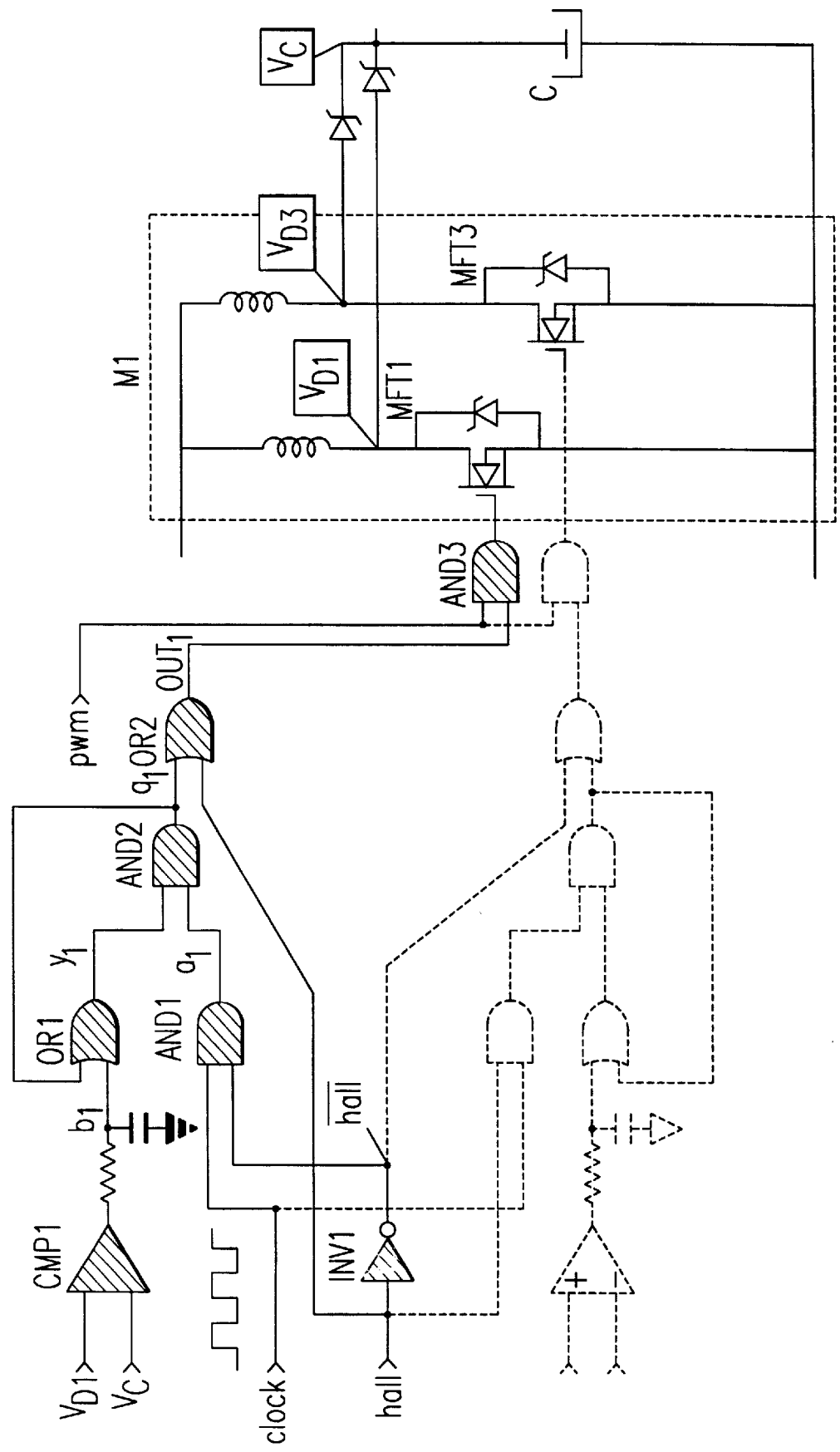
FIG. 14 is a schematic block diagram of an additional circuit for the electric motor of this invention.

To avoid the fall of the battery current it is necessary to add an electronic circuit (FIG. 14) to control the current in the phase which is switched off. This is attained, as described below, by artificially prolonging the conduction interval of each phase of submachine M1, feeding to the gate of the corresponding MOSFET a clock signal logically anded with the pwm signal that normally controls the phases of submachine M1 in order to maintain the battery current within the prescribed tollerance-band. The decrease of the phase current vs time (slope) is controlled at a value such to avoid battery current to fall out of the above mentioned.

The logic keeps the MOSFET definitively off when the phase current reaches zero. The behaviour of the circuit will be explained for one of the two phases (named 1) of submachine M1, providing and complementary circuitry is used for the other(s).

Figure 12:
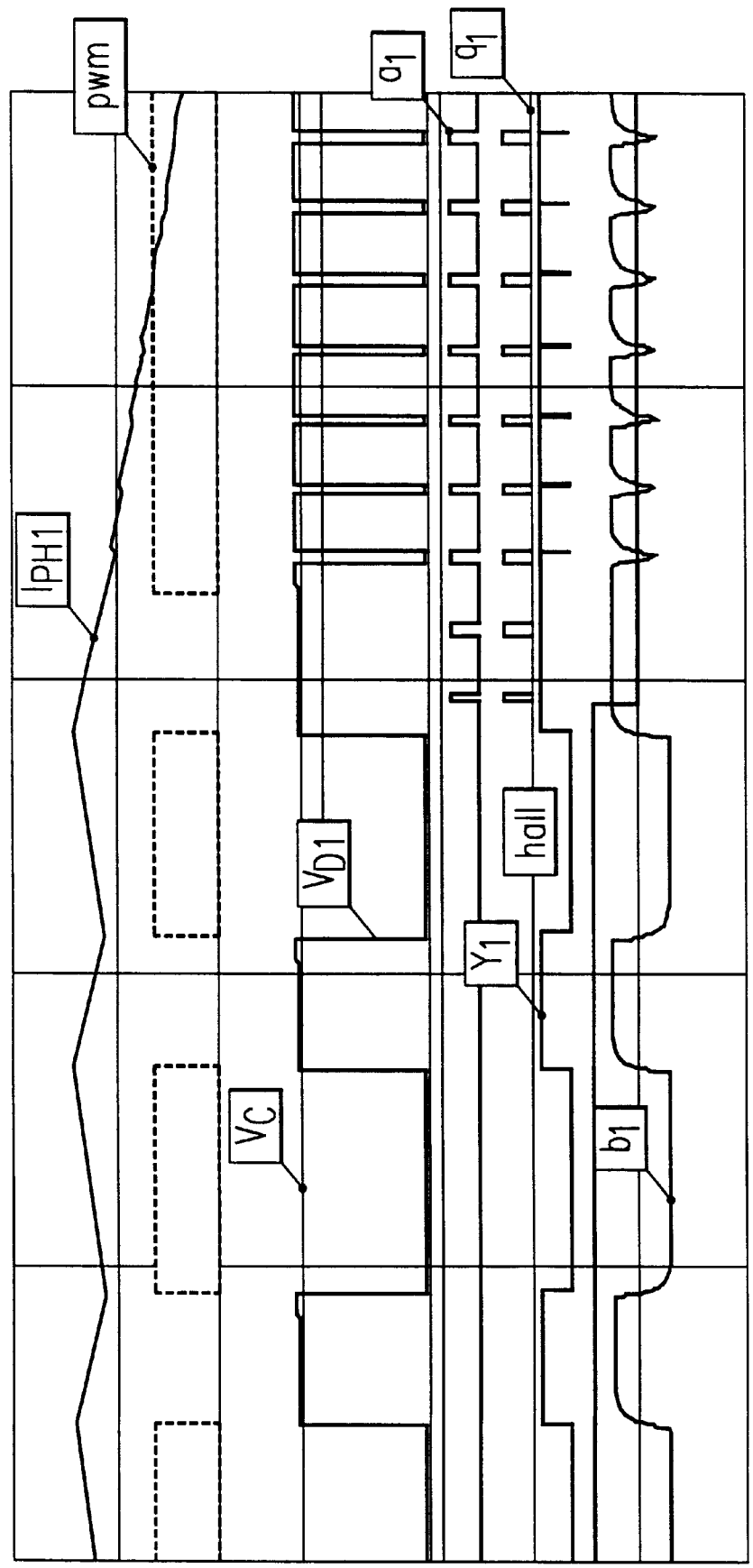
FIGS. 12 and 13 are further waveform diagrams.
Figure 13:
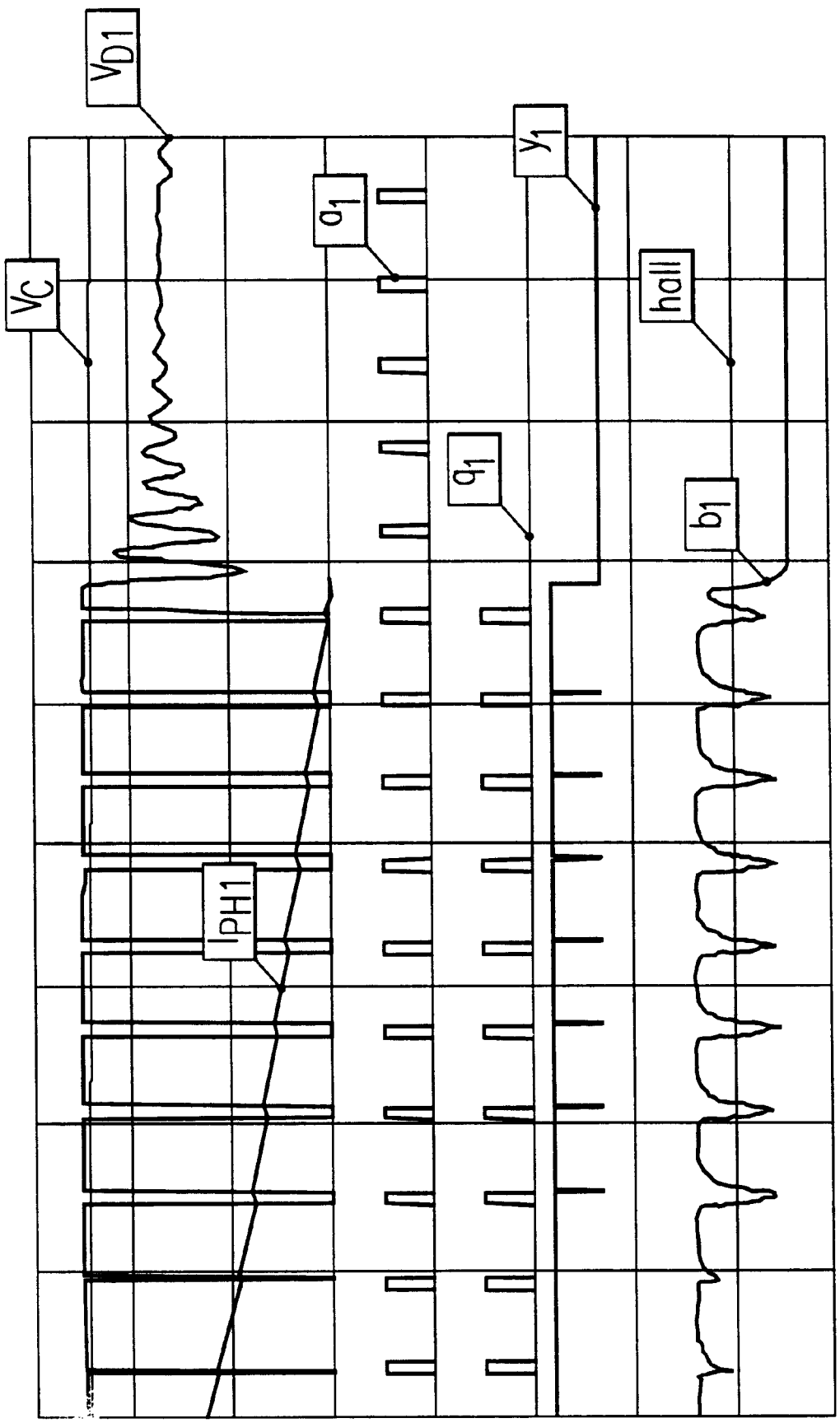

Referring to FIGS. 12 and 13, let the phase 1 switched off.

$V_{D1}$=voltage at the drain of MFT1

$V_C$=voltage across the capacitor C clock=square wave with duty-cycle value less than 50% the duty-cycle of the pwm signal and frequency value at least greater than three times the frequency of pwm signal hall=the Hall effect sensor signal which switches on phase 1 pwm=signal which normally controls the phases of submachine M1 in order to maintain the battery current within the prescribed tolerance-band.

When HALL goes down to <low>, MFT1 is switched (momentary) off, $V_{D1}$ becomes greater than $V_C$, $b_1$ goes to <high>, $y_i$ goes to <high> and $q_1$ will latch clock, $out_1$= clock:MFT1 will be controlled by pwm anded with the clock one (see FIG. 12).

When the current through the phase 1 reaches zero and $q_1$ (latched to clock) switches off MFT1, $V_{D1}$ cannot override $V_c$, $B_1$ goes to <low> and when clock goes to <low>, $y_1$ goes to <low>; suddenly $q_1$ will go to <low>, $out_1$ will go down to <low> and MFT1 will be definitively switched off (see FIG. 13).

What is claimed is:

1. An electronic commutation motor comprising:

a stator unit and a rotor unit configured as a first submachine and a second submachine;

said first submachine being pulse-modulation driven and comprising at least two first winding circuits each comprising a series combination of a winding having an inductance and a resistance and in which an induced electromotive force is produced, and a phase switching switch;

a capacitor;

at least two diodes coupled between respective of said at least two first winding circuits and said capacitor; and said first submachine and said at least two diodes configured to charge said capacitor to a controlled voltage applied to said second submachine as a power supply for said second submachine.

2. The motor of claim 1, wherein said second submachine comprises:

at least two second winding circuits, each comprising a series combination of a winding having an inductance and a resistance and in which an induced electromotive force is produced, and a phase switching switch.

3. The motor of claim 2, wherein said at least two first winding circuits are connected in parallel and said at least two second winding circuits are connected in parallel.

4. The motor of claim 2, wherein said first and said second submachines comprise diodes connected in parallel with respective of the switches of said winding circuits.

5. The motor of claim 2, comprising:

an electronic control unit configured to control a plurality of said switches on the basis of the controlled voltage of the capacitor, a current circulating within the voltage source, a voltage across the switches of the second submachine cinematic quantities of the motor.

6. The motor of claim 1, wherein said inductors are electromagnetically decoupled from each other or have windings which are inductively separated.

7. The motor of claim 2, wherein the record submachine has a number of inductors equal to the number of inductors of the first submachine.

8. The motor of claim 2, wherein the second submachine has a number of inductors different from the number of inductors of the first submachine.

9. The motor of claim 2, wherein said inductors of the second submachine are electromagnetically coupled together.

10. The motor of claim 2, wherein said inductors of the second submachine are electromagnetically decoupled from said inductors of the first submachine.

11. The motor of claim 1, wherein the first and second submachines have respective drivers independent from each other.

12. The motor of claim 11, wherein the driver of the second submachine is selected from the group consisting of unipolar, bridging, linear and PWM drivers.

13. The motor of claim 6 or 10, wherein the stator unit comprises teeth on which said windings are wound, further comprising:

a ferromagnetic element without windings interposed between two adjacent stator teeth provided with windings.

14. The motor of claim 13, wherein the windings of the first submachine are formed such that the respective phases are wound on different teeth separated by a ferromagnetic element without windings.

15. The motor of claim 2, wherein said inductors of the second submachine are electromagnetically decoupled from said inductors of the first submachine, and the stator unit comprises teeth on which said windings are wound, further comprising:

a ferromagnetic element without windings interposed between two adjacent stator teeth provided with windings; and the windings of the second submachine being formed such that the respective phases are wound on the same teeth.

16. The motor of claim 6 or 10, wherein the stator unit comprises teeth on which said windings are wound, further comprising:

a ferromagnetic element without windings interposed between two adjacent stator teeth provided with windings wherein each stator tooth provided with windings is split into a fork, between the ends of which is interposed said ferromagnetic element without windings.

17. The motor of claim 16, wherein the windings of the first submachine are formed such that the respective phases are wound on the forked ends of two adjacent teeth, said ends being separated by said ferromagnetic element without windings.

18. The motor of claim 1, comprising a power source selected from the group consisting of a d.c. voltage generator, a storage battery, and a rectified a.c. voltage generator and configured to apply a voltage to said first submachine.

19. The motor of claim 11, comprising a power source selected from the group consisting of a d.c. voltage generator, a storage battery, and a rectified a.c. voltage generator and configured to apply a voltage to said first submachine, wherein the driver of the first submachine comprises a current hysteresis driver configured to act on the windings of said first submachine to maintain the current circulating through said power source within a required range.

20. The motor of claim 19, wherein a switching frequency of the switches of said first submachine depends on electrical parameters of said first submachine.

21. The motor of claim 5, comprising:
a power source configured to apply a voltage to said first submachine;
a diode connected in series between the power source and the first submachine; and
a first switch controlled by the electronic control unit and connected in parallel with diode between the power source and said first submachine, said electronic control unit sensing a switch-on current and controlling said switch to bypass said diode when the sensed switch-on current falls below a predetermined value.

22. The motor of claim 21, comprising:
a resistor connected in series with said diode with the series combination of said diode and said first switch connected in parallel with said first switch.

23. The motor of claim 22, comprising:
said electronic control unit configured to sense said switch-on current by detecting a voltage across said resistor.

24. The motor of claim 21, comprising:
an L-C filter interposed between said power source and said first submachine.

25. The motor of claim 22, comprising:
an L-C filter interposed between said power source and said first submachine.

26. The motor of claim 23, comprising:
an L-C filter interposed between said power source and said first submachine.

27. The motor of claim 2, comprising:
a power source configured to apply a voltage to said first submachine;
wherein the controlled voltage to which said capacitor is charged is equal to 1.5 times the value of the voltage across said power source, the windings of said first submachine are formed by positioning in parallel a number of wires equal to three times a number of wires used for windings of said second submachine and have the same cross-section as wires used for windings of said second submachine.

28. The motor of claim 21, wherein the controlled voltage to which said capacitor is charged is equal to 1.5 times the value of the voltage across said power source, the windings of said first submachine are formed by positioning in parallel a number of wires equal to three times a number of wires used for windings of said second submachine and have the same cross-section as wires used for windings of said second submachine.

29. The motor of claim 26, wherein the controlled voltage to which said capacitor is charged is equal to 1.5 times the value of the voltage across said power source, the windings of said first submachine are formed by positioning in parallel a number of wires equal to three times a number of wires used for windings of said second submachine and have the same cross-section as wires used for windings of said second submachine.

30. The motor of claim 2, configured as a unipolar two-phase electrical machine with four inductor windings, in which two of said windings are inductively separated from each other to form the first submachine and the other two are inductively coupled together to form the second submachine, further comprising a driver having at least two MOS transistors having parasitic diodes and configured to drive said second submachine via said at least two MOS transistors so as to utilize the parasitic diodes for energy recovery.

31. The motor of claims 5, wherein the electronic control unit provides control of the controlled voltage across the capacitor such that:

$$V_c \geq V_b + E_{f1} + E_{m1},$$

where $V_b$ is the feed voltage of a power source applied to said first submachine, $E_{f1}$ is the emf per half wave of each of the windings of the submachine, and $E_{m1}$ is the induced emf due to the undersirable coupling between the windings of the submachine.

32. The motor of claim 1, comprising:
a power source configured to apply a voltage to said first submachine;
wherein the controlled voltage to which said capacitor is charged is more than 1.5 times the value of the voltage across said power source ($V_b$); and
an electronic circuit configured to control the current in a phase being switched off.

33. The motor of claims 21, wherein the controlled voltage to which said capacitor is charged is more than 1.5 times the value of the voltage across said power source, further comprising:
an electronic circuit configured to control the current in a phase being switched off.

34. The motor of claims 26, wherein the controlled voltage to which said capacitor is charged is more than 1.5 times the value of the voltage across said power source, further comprising:
an electronic circuit configured to control the current in a phase being switched off.

35. The motor of claim 32, wherein said electronic circuit applies a pulse wave modulated signal to control the phase switching switch of the winding circuit being switched off to artificially prolong the conduction interval of each phase of submachine.

36. The motor of claim 33, wherein said electronic circuit applies a pulse wave modulated signal to control the phase switching switch of the winding circuit being switched off to artificially prolong the conduction interval of each phase of submachine.

37. The motor of claims 35, comprising:
a circuit provided to definitively switch off said pulse wave modulated signal once the current in said winding circuit being switched off reaches zero.

38. The motor of claims 36, comprising:
a circuit provided to definitively switch off said pulse wave modulated signal once the current in said winding circuit being switched off reaches zero.

39. A circuit for applying power from a power source to a motor, comprising:
an input terminal configured to receive a start signal;
a diode connected in series between the power source and said motor;
a control unit configured to control application of power from the power source to the motor via a first switch controlled by the control unit and connected in parallel with said diode between the power source and said motor; and
said control unit configured to control said first switch to become conductive and bypass said diode upon receipt of said start signal at said input terminal and upon an initial current applied to the motor via said diode falling below a predetermined value.

40. The circuit according to claim 39, comprising:
a resistor connected in series with said diode, said control unit configured to control said first switch to be conductive when a voltage across the resistor falls below a predetermined value after receipt of said start signal.

41. The circuit according to claim 39, comprising:
an L-C filter interposed between said power source and said motor.

42. The circuit according to claim 39, comprising:
a second switch connected to the input terminal to initiate application of said start signal to said input terminal.

43. The circuit according to claim 39, comprising:
a second switch connected to the input terminal to initiate application of said start signal to said input terminal.

44. A method for applying power from a power source to a motor, comprising:
providing a diode in series between the power source and the motor,
initiating application of power from the power source to the motor via said diode upon receipt of a start signal;
sensing a switch-on current from the power source to the motor; and
bypassing said diode when the sensed switch-on current drops below a predetermined value.

45. The method of claim 44, comprising:
limiting current to said motor by connecting a resistor is series with the diode; and
bypassing both said diode and said resistor when the sensed switch-on current drops below a predetermined value.

46. The method of claim 45, wherein said sensing step comprises:
sensing a voltage across said resistor connected in series with the diode.

47. A circuit for applying power from a power source to a motor, comprising:
means for receiving a start signal;
a diode connected in series between the power source and said motor; and
control means for controlling application of power from the power source to the motor via a first switch connected in parallel with the diode between the power source and the motor, said control means controlling said first switch to bypass said diode when a switch-on current applied to the motor falls below a predetermined value.

48. The circuit according to claim 47, comprising:
a resistor connected in series with said diode, said control means controlling said first switch to be conductive when a voltage across the resistor falls below a predetermined value after receipt of said start signal.

49. The circuit according to claim 47, comprising:
an L-C filter interposed between said power source and said motor.

50. The circuit according to claim 48, comprising:
a second switch connected to the input terminal to initiate application of said start signal to said input terminal.

* * * * *